United States Patent [19]

Hare et al.

[11] Patent Number: 5,041,498

[45] Date of Patent: Aug. 20, 1991

[54] TRIMODAL ABS COMPOSITIONS HAVING GOOD GLOSS AND REDUCED GLOSS SENSITIVITY

[75] Inventors: Marie L. Hare, Saginaw; Patricia B. Leng, Midland, both of Mich.; Nigel Shields, Terneuzen, Netherlands; David E. Henton, Midland, Mich.

[73] Assignee: The Dow Chemical Company, Midland, Mich.

[21] Appl. No.: 459,910

[22] Filed: Jan. 2, 1990

[51] Int. Cl.[5] .................... C08L 55/02; C08L 51/04
[52] U.S. Cl. ........................................ 525/71; 525/316
[58] Field of Search ............................................ 525/71

[56] References Cited

U.S. PATENT DOCUMENTS

| | | | |
|---|---|---|---|
| 3,170,964 | 2/1965 | Grabowski | 525/71 |
| 3,509,237 | 4/1970 | Aubrey | 525/71 |
| 4,009,226 | 2/1977 | Ott et al. | 525/71 |
| 4,250,271 | 2/1981 | Morris et al. | 525/71 |
| 4,334,039 | 6/1982 | Dupre | 525/71 |
| 4,713,420 | 12/1987 | Henton | 525/71 |
| 4,767,833 | 8/1988 | Yumoto et al. | 525/71 |
| 4,785,051 | 11/1988 | Henton | 525/71 |
| 4,874,815 | 10/1989 | Bubeck et al. | 525/71 |

*Primary Examiner*—Carman J. Seccuro
*Attorney, Agent, or Firm*—James B. Guffey

[57] ABSTRACT

Rubber modified styrene-acrylonitrile (ABS) resins are provided which have three different types of rubber particles. One particle type is a small, emulsion-produced particle and another is a large emulsion-produced particle. The third particle type is a large, mass-polymerized graft copolymer particle which comprisees as its rubbery substrate a diene polymer ingredient containing at least about 80 weight percent of a polymerized diene monomer and which constitutes no more than about 30 weight percent of the total rubber components contained within the compositions of interest. The resulting compositions have very high gloss characteristics and reduced gloss sensitivity to molding condition variations.

10 Claims, No Drawings

TRIMODAL ABS COMPOSITIONS HAVING GOOD GLOSS AND REDUCED GLOSS SENSITIVITY

BACKGROUND OF THE INVENTION

The present invention pertains to certain rubber-modified monovinylidene aromatic polymer compositions which exhibit a beneficial combination of physical and aesthetic characteristics, in particular good gloss and reduced gloss sensitivity to molding conditions in combination with an advantageous balance of impact strength and melt flow rate properties.

It is well known in the art that various relatively rigid and/or brittle interpolymers of monovinylidene aromatic monomers with ethylenically unsaturated nitrile monomers can be made more impact resistant by the inclusion of amounts of various types of elastomeric materials (rubbers) into a matrix or continuous phase of said interpolymer material. Usually, the elastomeric materials are in the form of discrete particles, such particles having amounts of the matrix interpolymer, or an inter-or homopolymer similar thereto, graft-polymerized to the particles. These types of rubber-modified, impact-resistant polymeric compositions are commonly known and referred to as graft copolymers or polyblends. Among the best known of these types of compositions are the ABS or ABS-type compositions. Compositionally, ABS or ABS-type compositions generally comprise a combination of an elastomer usually containing polymerized butadiene, with a rigid interpolymer of monovinylidene aromatic monomer with ethylenically unsaturated nitrile monomer. Structurally, ABS or ABS-type compositions usually consist of the rigid, matrix or continuous phase having dispersed therein particles of the elastomer, such particles usually having grafted thereto amounts of the rigid interpolymer or a similar inter-or homopolymer.

It is also well known in the art that the physical properties of these types of compositions are greatly affected by the relative amounts of elastomer particles having different sizes and particle structures. Larger rubber particles having diameters greater than about 0.5 micron ($\mu$) contribute greatly to impact resistance but tend to reduce the gloss of articles formed or molded from compositions containing them especially in the case of the below-described mass particles. On the other hand, when smaller rubber particles are used in rubber-modified polymer compositions, articles formed therefrom tend to be glossier but are less impact resistant than if the same amount of rubber was used in the form of larger particles.

Furthermore, concerning the structures of the individual rubber particles (i.e., rubber particle morphology), there are well-known advantages and disadvantages accompanying the use of either of the two main rubber-particle types in rubber-modified polymer compositions. It is generally believed that grafted rubber particles containing occlusions of matrix polymer therein, this being one of the two main rubber-particle types, provide more impact resistance than the same amount of rubber in the form of similarly grafted, solid rubber particles, the latter being the other main particle type. Such grafted, occlusion-containing rubber particles are usually formed and grafted in a mass-type or mass-suspension-type polymerization process where a previously-produced rubber is dissolved in an amount of polymerizable monomer(s) with optional diluents, which monomer(s) are thereafter polymerized. Occlusion-containing particles produced in such mass, mass-solution or mass-suspension processes or variation of these processes are hereafter referred to as "mass particles". It is difficult, however, using available types of rubber and mass process equipment to produce groups of mass particles having volume averaged diameters less that $0.5\mu$.

It is also well known in the art that mass particles present in rubber-modified polymeric compositions can have a very detrimental effect on the gloss of articles formed therefrom. In spite of the disadvantages of mass particles, however, they are a very desirable constituent of rubber-modified polymer compositions. One basis for their desirability is that they provide a great deal of impact resistance for the amount of rubber which is actually included. Other desirable facets of including mass rubber particles in rubber-modified polymer compositions include the ability to utilize a wide variety of rubber compositions and types and the economy and efficiency of the mass-type processes by which they are formed.

The other main type of rubber particle morphology (i.e., the above-mentioned "solid" or non-occluded grafted rubber particles) is usually achieved via emulsion polymerization of the rubber in the form of an aqueous latex. After the rubber is made, monomers which are polymerizable and graftable (e.g., styrene and acrylonitrile) are usually added to the rubber-containing latex and polymerized to form the graft portion as well as amounts of matrix polymer. The non-occluded type of rubber particles, produced via emulsion polymerization process, are hereinafter referred to as "emulsion-particles". When these emulsion particles have been grafted with a different, relatively rigid polymer, but still have a high rubber concentration, at least about 30 weight percent or so, these compositions are very suitable for blending with additional amounts of the same or different rigid polymer, optionally containing additional amounts of rubber, to achieve desired rubber contents in the resultant compositions. Such blendable intermediates are often referred to as "grafted rubber concentrates or "GRC's" and can be used to produce a wide variety of rubber-modified polymer compositions.

Under most circumstances, emulsion polymerization techniques are generally economically feasible only for the production of rubber particles having volume averaged diameters of less than about 0.25 micron or so. Such particles must usually be agglomerated or coagulated in some way before, during and/or after grafting in order to achieve rubber particles having volume average diameters greater than about 0.5 micron. Agglomerating and coagulating techniques are well known in the art. See, for example, U.S. Pat. Nos. 3,551,370; 3,666,704; 3,956,218 and 3,825,621; all of which are included herein by reference. A particularly desirable technique for the controlled agglomeration of the particles of an emulsion-prepared rubber in an aqueous dispersion is taught in U.S. Pat. No. 4,419,496 entitled "Particle Agglomeration in Rubber Latices" by D. E. Henton and T. M. O'Brien, which issued on Dec. 6, 1983 and the teachings of which are hereby incorporated herein by reference.

As is obvious from the above discussion, and well known in the art, emulsion polymerization techniques are well-suited for preparation of smaller rubber particles while mass-type processes or agglomeration of smaller, emulsion particles can be used to achieve large particle sizes.

As is also generally known in the art, there are other individual characteristics of rubber particles, once the desired size has been determined, which can be conveniently and separately controlled to optimize certain properties of the rubber-modified polymer compositions to which they are added. Some parameters which are subject to quite wide variation to affect the physical properties of the resultant compositions include the molecular weight of the mass rubber, the degree to which either mass or emulsion rubber is crosslinked and the amounts and types of different polymers which are grafted to the particles.

In view of these phenomena observed in the production of ABS and ABS-type compositions, a great deal of effort has gone into achieving optimized physical properties for a given or particular purpose by tailoring the rubber particle distributions (i.e., the sizes and types of rubber particles and the amounts of different size and/or type rubber particles) in the ABS and ABS-type compositions. See, for example, representative U.S. Pat. Nos. 3,509,237; 3,576,910; 3,652,721; 3,663,656; 3,825,621; 3,903,199; 3,903,200; 3,928,494; 3,928,495; 3,931,356; 4,009,226; 4,009,227; 4,017,559; 4,221,883; 4,224,419; 4,233,409; 4,250,271 and 4,277,574; wherein various "bimodal" particle size distributions are disclosed. As used in the art and herein, a composition having a "bimodal" particle size distribution contains two distinct groups of rubber particles, each group having a different average particle size. More recently, there have been disclosed "trimodal" rubber particle size rubber-reinforced polymer compositions wherein the rubber reinforcing ingredient takes the form of three distinct types of rubber particles. Thus, for example, in U.S. Pat. No. 4,430,478 to Schmitt et al. and in U.S. Pat. No. 4,713,420 to Henton there are disclosed compositions wherein relatively small emulsion rubber particles are used in combination with relatively large emulsion rubber particles and with large mass rubber particles. The resulting "trimodal" compositions are characterized as having good combinations of toughness and gloss.

In accordance with Schmidt et al.'s U.S. Pat. No. 4,430,478, it is essential that the relatively large mass or solution rubber particles thereof have a number average particle diameter of from 0.5 to 5 micron (with the number average diameter range of 0.9 to 2.1 being especially preferred) and it is indicated that said rubber particles can suitably be polybutadiene homopolymer, styrene/butadiene block copolymers or mixtures thereof. It can also be noted that this patent appears to require its elastomeric graft copolymer constituents to constitute at least 20 weight percent of the overall composition weight and that the working examples thereof utilize very large mass rubber particles and relatively large amounts of the elastomeric-constituents and employ the large emulsion particle in major proportion relative to the amount of small emulsion particle employed therein.

In accordance with the teachings of Henton's U.S. Pat. No. 4,713,420, a wide variety substrate rubbers may be employed with preferred substrate rubbers being those consisting of from 70 to 100 weight percent of butadiene or isoprene and up to about 30 weight percent of a monovinylidene aromatic or unsaturated nitrile comonomer. Also in accordance with such teachings, the large mass rubber particles can suitably have a volume average particle size of from about 0.5 to about 10 micron and can constitute from as little as 5 to as much as 95 weight percent of the total rubber content and the total rubber content of the rubber-modified polymer compositions thereof can range from 5 to 40 weight percent on a total composition weight basis.

The aforementioned Henton patent also indicated that the compositions thereof can exhibit a broad range of specific property balances ranging, for example, from compositions having a combination of very high toughness and low gloss at one extreme to compositions having very high gloss and good toughness at the other. In the latter case, it is indicated that the mass rubber particle constituent employed should have volume average diameter of from about 0.6 to about 0.9 micron and should constitute from about 35 to about 50 weight percent to the total rubber content.

As is well known to those skilled in the rubber-modified polymer art, one practical problem which can be encountered with various rubber-modified polymer compositions when used in actual practice to prepare molded articles is that certain physical and/or aesthetic characteristics of the resulting molded article can be adversely affected by the molding conditions employed. Thus, for example, one common problem which has been observed with conventional, commercially available ABS resins is that the gloss of a part molded therefrom can be less than what is actually achievable with a given ABS resin if inadequate molding pressure is employed in the molding operation in question. Such phenomenon is often referred to as gloss sensitivity to molding pressure or molding conditions and the lower molded article gloss (i.e., a lower gloss value than is otherwise achievable under proper or optimum molding conditions) is often referred to as "short shot gloss". Gloss gradient is another name for this phenomenon. The gloss decreases from the injection point to the far end of a part because of the decreasing pressure exerted upon the distant location. Since the foregoing problem is fairly commonly encountered within the plastics molding industry, it would be highly desirable if there could be provided rubber-modified molding compositions having reduced gloss sensitivity to molding conditions and, particularly, if such could be accomplished without attendant sacrifices in other important properties or characteristics such as toughness or impact strength and melt flow rate characteristics.

SUMMARY OF THE INVENTION

It has now been discovered that certain trimodal rubber particle size-based rubber-modified monovinylidene aromatic polymer compositions can be provided having very high gloss characteristics and reduced gloss sensitivity to varied molding conditions while still maintaining a desirable combination of toughness and melt flow characteristics by proper and careful control and selection of several key parameters and criterion. In particular, it has been found that in order to suitably accomplish the foregoing, one must utilize a diene polymer having a polymerized diene monomer content of at least about 80 weight percent as the rubber constituent of the mass rubber ingredient; limit the particle size of said mass rubber ingredient to a volume average particle size of from about 0.15 to about 0.95 micron and to a number average particle size range of from about 0.1 to about 0.45 and limit the content of said mass rubber ingredient to less than 30 weight percent of the total rubber content; and utilize a total rubber content within such composition of less than 14 weight percent on a total composition weight basis. Accordingly, the present invention is an improved rubber-modified, glossy impact-resistant polymeric composition comprising:

(a) a continuous matrix phase comprising an interpolymer comprising monovinylidene aromatic monomer and ethylenically unsaturated nitrile monomer polymerized therein; and (b) dispersed in such matrix in the form of discrete particles, from about 5 to less than 14 weight percent, based on the total weight of said polymeric composition, of elastomeric material (rubber), wherein the dispersed rubber particles are composed of the following three rubber components:

(1) a small-particle emulsion rubber component being from about 10 to about 88 weight percent of the total rubber content, the particles of this component having a volume average diameter of from about 0.05 to about 0.25 microns ($\mu$);

(2) a large emulsion particle rubber component being from about 7 to about 85 weight percent of the total rubber content, the particles of this component having a volume average diameter of from about 0.35 to about 0.95 microns; and (3) a mass rubber particle component being from about 5 to about 30 weight percent of the total rubber content, the particles of this component having a volume average diameter of from about 0.15 to about 0.95 micron and having a number average diameter of from about 0.1 to about 0.45 micron, and said mass particle rubber component being a diene polymer material containing at least about 80 weight percent, on a diene polymer material weight basis, of a polymerized diene monomer.

DETAILED DESCRIPTION OF THE INVENTION

The present invention comprises two essential elements: (a) the monovinylidene aromatic/ ethylenically unsaturated nitrile interpolymer in the matrix or continuous phase and (b) the particulate elastomeric material (rubber) dispersed in the matrix, the elastomeric material in turn comprising three components. In addition, there is generally an amount of so-called "superstrate" polymer, be it interpolymer or homopolymer, graft polymerized or grafted onto the rubber particles or substrate. There is also an amount of polymer occluded within the mass particles in addition to the amounts grafted thereto. There may also be some occluded polymer in the emulsion rubber particles, but significantly less than the amount in the mass particles. It should be noted that as used herein the terms "polymer" and "polymerization" are generic, and can include either or both of the more specific cases of "homo- and interpolymer" and "homo- and interpolymerization", respectively.

The matrix or continuous phase of the present invention (i.e. the non-elastomeric, non-grafted and non-occluded portion) consists at least principally of an interpolymer comprising polymerized therein monovinylidene aromatic monomer and ethylenically unsaturated nitrile monomer. Since the most common example of these interpolymers is poly (styrene-acrylonitrile), also known as SAN, these compositions are generically known as SAN-type compositions or more simply as SAN. In general, the matrix portion of the present invention comprises at least about 50 percent by weight, preferably at least about 65 percent by weight, more preferably at least about 90 percent by weight of the interpolymer comprising monovinylidene aromatic and ethylenically unsaturated nitrile monomers polymerized therein. The balance of the matrix volume can be made up of (1) comonomers interpolymerized into the interpolymer comprising monovinylidene aromatic and ethylenically unsaturated nitrile monomers polymerized therein; (2) additional non-elastomeric polymeric material combined therewith and/or (3) other filler-type materials.

As is well known in the art, as the molecular weight of matrix polymer (as well as that of the grafted polymer) increases, the toughness of the resultant rubber-modified polymer composition increases while the gloss and flow tend to be decreased.

It has been found that the weight average molecular weight (Mw) of all of the matrix (ungrafted) polymer, from all sources should be from about 40,000 to about 300,000 preferably from about 70,000 to about 200,000. In other words, the Mw's of the ungrafted, unoccluded polymer included in the present rubber-modified polymer compositions; which amounts of polymer (a) can be produced during the grafting of the small particles, (b) can be produced during the grafting of the large emulsion particles, (c) can be produced during the grafting of the large mass particles and/or (d) can be from other sources of ungrafted matrix polymer; will average out to be within the desired range.

Exemplary of the monovinylidene aromatic monomers which, in polymerized form, may be included in compositions according to the present invention are styrene; alpha-alkyl monovinylidene aromatic monomers (e.g., alpha-methylstyrene, alpha-ethylstyrene, alpha-methylvinyltoluene, alpha-methyl dialkylstyrenes, etc.); ring-substituted alkyl styrenes (e.g., ortho- meta-, and paravinyl toluene; o-ethylstyrene; p-ethylstyrene; 2,4-dimethylstyrene; p-tertiarybutyl styrene; etc.); ring-substituted halostyrenes (e.g., o-chlorostyrene, p-chlorostyrene, o-bromostyrene, 2,4-dichlorostyrene, etc.); ring-alkyl, ring-halosubstituted styrenes (e.g., 2-chloro-4-methylstyrene, 2,6-dichloro-4-methylstyrene, etc.) vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed. Typically, such monovinylidene aromatic monomer will constitute from about 50 to about 95, preferably from about 65 to about 85, weight percent of the indicated monovinylidene aromatic/ethylenically unsaturated nitrile interpolymer.

Exemplary of the unsaturated nitriles which may be included are acrylonitrile, methacrylonitrile, ethacrylonitrile, fumaronitrile and mixtures thereof. The unsaturated nitrile is generally employed in the matrix interpolymer in an amount of from about 5 to about 50, preferably from about 15 to about 35 weight percent based on the total weight of monovinylidene aromatic monomer and ethylenically unsaturated nitrile monomer employed in preparing the interpolymer containing those two monomers.

In addition to monovinylidene aromatic monomers and ethylenically unsaturated nitrile monomers, various additional monomers may be desirably included, in polymerized form, in the rubber-modified polymer compositions according to the present invention. Exemplary of such additional monomers are conjugated 1,3 dienes (e.g., butadiene, isoprene, etc.); alpha- or beta-unsaturated monobasic acids and derivatives thereof (e.g., acrylic acid, methylacrylate, ethylacrylate, butyl acrylate, 2-ethylhexyl acrylate, methacrylic acid and the corresponding esters thereof such as methyl methacrylate, etc., acrylamide, methacrylamide and the like); vinyl halides such as vinyl chloride, vinyl bromide, etc.; vinylidene chloride, vinylidene bromide, etc.; vinyl esters such as vinyl acetate, vinyl pripionate, etc.; ethylenically unsaturated dicarboxylic acids and anhydrides and derivatives thereof such as maleic acid, fumario acid, maleic anhydride, dialkyl maleates or fumarates such as dimethyl maleate, diethyl maleate, dibutyl maleate, the corresponding fumarates, n-phenyl maleimide, etc.; and the like. As is known in the art, the amount of these comonomers which may be included will vary as the result of various factors. The amount of such monomers employed will generally be less than about 10 weight percent based on the total weight of the monomers employed in preparing the non-rubber, polymeric portions of the rubber-reinforced product hereof.

The various includable monomers can be incorporated into compositions according to the present invention in any or all of several ways. For example, one or more of the additional monomers may be interpolymerized into the monovinylidene aromatic/ethylenically unsaturated nitrile matrix interpolymer. Additionally, one or more of the includable monomers can be graft polymerized onto, and in the case of mass particles, polymerized and occluded within the rubber particles. In addition, one or more of the includable monomers can be otherwise polymerized into polymeric components which can be combined (e.g., blended with) into rubber-modified polymer compositions according to the present invention.

In one embodiment of the present invention, it has been found that methyl methacrylate can advantageously be included in compositions according to the present invention, in polymerized form, in any or all of the above-described manners in amounts of from about 1 to about 40 weight percent based on the total weight of the polymerized monovinylidene aromatic, ethylenically unsaturated nitrile and methyl methacrylate monomers present therein in the form of matrix, grafted and/or occluded polymer.

It may also be desirable to include in the present ABS or ABS-type compositions amounts of other polymers and/or copolymers such as polymers and/or copolymers of phenylene oxide, polycarbonates, polyesters and polyester polycarbonates.

As will be readily appreciated, superstrate polymer grafted to the rubber particles and interpolymer present in the matrix can have the same or different compositions as long as they are compatible. For the purposes of the present invention, an interpolymer in the matrix and a different graft polymer are considered compatible if a blend of the graft polymer with the matrix interpolymer would exhibit good physical properties. Preferentially, a blend of a graft interpolymer with a compatible matrix interpolymer exhibits a single glass transition temperature (Tg) as measured by differential scanning calorimetry (DSC). For example, it has been found that both polymethylmethacrylate and poly (methyl methacrylateethyl acrylate) are suitably compatible with SAN and SAN-type polymers. The Tg of a composition is advantageously measured using a differential scanning calorimeter. With this in mind, the grafted polymer can be prepared from one or more of the monomers which are described above as suitable for inclusion into compositions according to the present invention. Preferably, however, said grafted polymer is an interpolymer compositionally similar to the matrix interpolymer.

The various techniques suitable for producing matrix polymer and the desired grafted (and occluded) polymer are well known in the art. Examples of these known polymerization processes include mass, mass-solution, mass-suspension, suspension and emulsion polymerization processes as well as other modification and/or combinations of such processes. See, for example, U.S. Pat. Nos. 3,509,237; 3,923,494; 4,239,863; 4,243,765; and 4,250,271; which teach such processes and which are incorporated herein by reference. As is obvious and well known in the art, the same reaction that is grafting homo- or interpolymer onto one or more of the rubber components can advantageously be used to produce all or part of a corresponding ungrafted homo- or interpolymer for the matrix portion. It should be noted that any production of grafted polymer, in most cases, inherently produces small amounts of ungrafted (i.e. matrix) polymer. Advantageously (1) the small emulsion particles and large emulsion particles are grafted at the same time with monovinylidene aromatic and ethylenically unsaturated nitrile monomers and produce, also at the same time, a small amount of ungrafted SAN or SAN-type interpolymer; (2) the grafting of the mass particles is done with the same or different monovinylidene aromatic and ethylenically unsaturated nitrile monomers in a different, separate process and also produces a portion of the total ungrafted SAN or SAN-type interpolymer desired for the matrix of the final composition; (3) the balance of the ungrafted SAN or SAN-type interpolymer desired as the matrix of the rubber-modified polymer composition hereof is produced separately; and (4) the indicated ingredients are then combined to form the subject polymer compositions. Advantageously, the separately produced SAN or SAN-type interpolymer is produced in a mass or mass-solution type of polymerization process.

In graft polymerization reactions, as is well known in the art, the desired polymerizable monomers are combined with the preformed rubber substrate and the monomers then polymerized to chemically combine or graft at least a portion of the forming polymer upon the rubber substrate. Depending upon the ratio of monomers to rubber substrate and the polymerization conditions, it is possible to achieve both the grafting of the desired amount of polymer onto the rubber substrate and the polymerization of ungrafted polymer to provide all or a portion of the matrix at the same time.

Various substrate rubbers (onto which the superstrate polymer may be grafted during polymerization in the presence of such rubber) are utilizable as the small and large emulsion particles. These rubbers include diene rubbers, polyisoprene rubbers, halogen-containing rubbers and mixtures thereof as well as interpolymers of rubber-forming monomers with other copolymerizable monomers. The preferred rubbers for use in preparing said small and large emulsion particles are diene rubbers or mixtures of diene rubbers, i.e., any rubbery polymers (a polymer having a second order transition temperature not higher than 0° C., preferably not higher than −20° C., as determined by ASTM Test D-746-52T) of one or more conjugated 1,3-dienes, e.g., butadiene, isoprene, piperylene, chloroprene, etc. Such rubbers include homopolymers and interpolymers of conjugated 1,3-dienes with up to equal amount by weight of one or more copolymerizable monoethylenically unsaturated monomers, such as monovinylidene aromatic hydrocarbons (e.g., styrene; a ring-substituted alkylstyrene, such as the o-, m-, and p-vinyl toluene, 2,4-dimethylstyrene, the ring-substituted ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); ring-substituted halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.); the corresponding alkyl methacrylates; acrylamides (e.g., acrylamide, methacrylamide, N-butyl acrylamide, etc.); unsaturated ketones (e.g., methyl vinyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

As has been noted above, the rubber substrate used for the relatively large mass graft copolymer particle should be a diene polymer material containing at least about 80 weight percent (preferably at least about 85 weight percent) of a polymerized diene monomer in order to achieve the various property and performance benefits of the subject invention. This rubber substrate will, here again, typically have a second order glass transition temperature of 0° C. or less, preferably −20° C. or less. Especially preferred for use as the mass rubber substrate are diene homopolymer materials and, in particular, poly (1,4-butadiene)

Although the aforementioned rubber ingredients may contain up to about 2 percent of a cross-linking agent, based on the weight of the rubber-forming monomer or monomers, cross-linking may present problems in dissolving the rubber in the monomers for the graft polymerization reaction, particularly for a mass or suspension polymerization reaction, and is therefore not generally preferred for mass or suspension polymerized ingredients. Excessive cross-linking can result in loss of the rubbery characteristics even for the emulsion polymerized ingredients. In the event that cross-linking agent is employed it can be any of the agents conventionally employed for cross-linking diene rubbers, for example, divinylbenzene, diallyl maleate, diallyl fumarate, diallyl adipate, allyl acrylate, allyl methacrylate, diacrylates and dimethylacrylates of polyhydric alcohols (e.g., ethylene glycol dimethacrylate, etc.), and the like.

A preferred group of rubbers for use as the emulsion rubber particles are those consisting essentially of 70 to 100 percent by weight of butadiene and/or isoprene and up to 30 percent by weight of monomer selected from the group consisting of monovinylidene aromatic hydrocarbons (e.g., styrene) and unsaturated nitriles (e.g., acrylonitrile), and acrylates (e.g. methyl methacrylate) or mixtures thereof. Particularly advantageous emulsion rubbery polymer substrates include butadiene homopolymer and interpolymers of 90 to 99 percent by weight butadiene and 1 to 10 percent by weight of acrylonitrile and/or styrene. Preferred rubbers for use as the mass rubber particles include homopolymers of butadiene or isoprene with butadiene homopolymers being especially preferred.

Various techniques are customarily employed for polymerizing rubber monomers including Ziegler-Natta, anionic and free radical polymerization. Free radical emulsion polymerization can be used to produce a latex emulsion which is useful as the base for emulsion polymerization of the graft polymer. See, for example, U.S. Pat. No. 4,243,765 which has been incorporated herein by reference.

In general, in compositions according to the present invention, there will be dispersed therein in the form of particles, a total of from about 5 to less than 14 weight percent rubber, based on the total rubber-modified polymer composition weight. If larger rubber contents are employed, the desired high level of gloss and relative insensitivity of gloss to molding conditions are not suitably attained. Preferably, the rubber-modified compositions hereof contain a total of from about 7 to about 13.5 (more preferably from about 8 to about 13) weight percent of dispersed rubbery polymer on a total composition weight basis.

One important criterion of the present invention is that the particulate rubber dispersed in the interpolymeric matrix comprises three different components and it is generally preferred that the dispersed particulate rubber consist essentially of said three particle components. By the term "rubber particle component", it is meant a group of rubber particles of the same rubber particle type and having about the same particle size. As discussed above, the two main rubber particle types are (1) the occluded particles made in a mass-type process and (2) the solid, relatively non-occluded particles made in an emulsion polymerization process. Each rubber component can then be characterized by the combination of the average size of the particles and the process by which they are formed. The average particle size of a rubber particle component, as used herein, will, unless otherwise specified, refer to the volume average diameter of the group of particles making up the rubber component of particle type. In most cases, the volume average diameter of a group of particle is the same as the weight average. In the case of the emulsion-produced rubber particles, the average particle diameter measurement is typically made before any of the interpolymer is grafted thereto, while in the case of the mass particles, the size generally includes the polymer grafted to the rubber particles and occlusions of polymer within the particles. The volume average diameters of emulsion particle groups having average particle diameters of less than about 1 micron can be conveniently determined, as can the number average diameters and the particle size distribution, by analysis of transmission electron micrographs or hydrodynamic chromatography (HDC). Hydrodynamic chromatography is explained in U.S. Pat. No. 3,865,717. In the case of groups of mass particles and groups of emulsion particles having average particle diameters of more than about 1 micron, the volume average diameters, number average diameters and particle size distributions can be determined by the analysis of transmission electron micrographs of the compositions containing the particles.

It is recognized, of course, that the various rubber particle components comprise particles having a range of sizes, such components not consisting of particles of only one size. The above analysis techniques indicate, however, that the particles of a particular rubber particle component generally have a fairly narrow range of particle sizes. By this it is meant that the ratio of the volume average particle diameter of a particle group to the number average particle diameter of the same particle group is generally in the range of from about 1 to about 3.5.

One of the rubber components in the present invention, hereinafter referred to as the small particle component, has a relatively small average particle size, the particles thereof having a volume average particle diameter of from about 0.05 to about 0.25$\mu$ and a number average particle diameter of from about 0.013 to about 0.17$\mu$. As discussed above, these small-sized particles are most conveniently prepared by emulsion polymerizing a mixture of rubber-forming monomers to form a dispersion of uniformly sized particles of the desired size, as is well known in the art. See for example, U.S. Pat. Nos. 3,509,237; 3,928,494; 4,243,769; and 4,250,271 which have been incorporated herein by reference and which teach suitable processes. It has been found that this component advantageously has a volume average particle diameter of from about 0.08 to about 0.20$\mu$ and a number average particle diameter of from about 0.02 to about 0.13$\mu$.

The small particle component typically makes up from about 10 to about 88 weight percent of the rubber in the present invention. However, it has been found preferable to use from about 15 to about 75 weight percent while from about 25 to about 65 weight percent is especially preferable. Within these ranges, the amount of small particle rubber helps to control the gloss of the resultant polymeric composition. At constant rubber content, increasing the amount of small particle rubber increases the gloss. Reducing the percentage of small particle rubber will generally produce tougher resultant compositions with the loss of some gloss.

It is usually desirable in grafting polymer onto the particles of this small rubber particle component to achieve a graft-to-rubber weight ratio of at least about 0.3 and preferably from about 0.3 to about 2 in order to achieve desired gloss and impact resistance in the resultant ABS or ABS-type product. Graft-to-rubber weight ratio can be determined by extracting the polymer with an excess of a non-rubber solvent, separating the phases by centrifugation, and determining their dry weights. The weight of the graft is the portion of the insoluble phase that is not rubber.

Another requisite rubber component to be included in the present rubber-modified compositions is referred to as the large emulsion particle component. This component has a volume average particle diameter of from about 0.35 to about 0.95$\mu$, preferably from about 0.5 to about 0.9$\mu$. The corresponding number average particle diameter for this component is from about 0.10 to about 0.63$\mu$ and is preferably from about 0.14 to about 0.53$\mu$.

This first larger particle component typically makes up from about 7 to about 85 weight percent of the dispersed rubber, preferably from about 10 to about 50 weight percent and most preferably from about 15 to about 40 weight percent.

Since most emulsion polymerization processes do not inherently produce particles in the aforementioned large emulsion particle size range, the particles of this component can be produced by agglomerating or coagulating emulsion-produced dispersions of smaller rubber particles, either before, during or after the particles are grafted. See, for example, U.S. Pat. Nos. 3,551,370; 3,666,704; 3,956,218; and 3,825,621 which have been incorporated herein and which teach suitable processes.

As discussed above, within the ranges of particle types and amounts specified for this component, the use of the relatively larger particles in this component and/or the use of larger percentages of this component will usually result in better impact-resistance in the resultant polymer composition.

It is usually desirable to graft enough polymer onto the particles of this large emulsion rubber particle component to achieve a graft-to-rubber ratio of at least about 0.05 in order to balance gloss and impact properties in the resultant ABS or ABS-type composition. Preferably, the graft-to rubber ratio for this component will be from about 0.05 to about 0.65, especially from about 0.08 to about 0.50.

The aforementioned small and large emulsion rubber particles are typically employed in a weight ratio of the former to the latter of from about 0.05 to about 19.0, preferably from about 0.18 to about 9 and most preferably from about 0.62 to about 4.3.

The third requisite rubber component to be employed within the present improved rubber-modified, impact-resistant polymer compositions is referred to as the mass particle component. This component has a volume average particle diameter of from about 0.15 to about 0.95$\mu$, and a number average particle diameter of from about 0.1 to about 0.45$\mu$. Preferably, the volume average diameter of the particles of this component is from about 0.4 to about 0.9$\mu$ and the number average diameter thereof is from about 0.2 to about 0.4$\mu$.

This mass particle component typically makes up from about 5 to about 30 weight percent of the rubber, preferably from about 10 to about 30 and most preferably from about 10 to about 25 weight percent thereof.

It has been found most desirable for this component to use particles resulting from a mass-type or mass-suspension-type grafting process which produces particles having grafted thereto and occluded therein amounts of a desired superstrate polymer, preferably SAN or SAN-type polymer, Such mass processes, as is well known in the art, can be very satisfactorily employed to produce rubber particles having appropriate sizes for utilization in this component. See, for example, U.S. Pat. Nos. 3,509,237 and 4,239,863 which have been incorporated herein by reference and which teach suitable processes.

In general, it is usually desirable to have from about 10 to about 85, preferably from about 20 to 75 and more preferably from about 25 to about 50, weight percent of the mass particles consist of grafted and occluded polymer, the balance being the rubber. It is also generally preferred that the mass (or mass suspension) polymerized ingredient employed to prepare the polymeric compositions hereof contain from about 99.2 to about 43.9 (more preferably from about 95.0 to about 82.0) weight percent of non-grafted/non-occluded matrix polymer constituent and that said ingredient have a total rubber content of less than 10 weight percent of the total weight of said ingredient. Preferred mass-type graft copolymers ingredients for use herein thus typically have a rubber content, on the basis of that ingredient per se, in the range of from about 0.75 to about 9.9, especially from about 4 to about 9.5, weight percent.

Within the above-described ranges, the use of this mass rubber particle component imparts desirable levels of impact-resistance to the resultant polymer compositions without adversely affecting gloss properties to an expected and unacceptable degree. In fact, compositions according to the present invention exhibit an excellent combination of gloss and impact-resistance for the sizes of the particles and the amount of rubber they contain. Moreover, the gloss properties of such composition are substantially less sensitive to molding condition variations than are comparable compositions containing larger relative amounts of larger size mass rubber particles. The use of the indicated amounts of the indicated mass rubber particles thus provide rubber-modified molding compositions having very high gloss characteristics and improved insensitivity to molding conditions variations while still providing desirable levels of impact resistance and melt flow rate characteristics.

Especially preferred, compositions hereof having very high gloss combined with at least moderate toughness characteristics comprise as the modifying rubber;
(a) from about 25 to about 65 weight percent small emulsion particles having a volume average diameter of from about 0.08 to about $0.2\mu$ and a number average diameter of from about 0.02 to about $0.13\mu$,
(b) from about 20 to about 40 weight percent large emulsion particles, preferably resulting from the agglomeration of smaller particles, having a volume average diameter of from 0.4 to about 0.9 and a number average diameter of from about 0.10 to about 0.53 micron, and
(c) from about 10 to about 25 weight percent large mass particles having a volume average diameter of from about 0.4 to about $0.9\mu$ and having a number average diameter of from about 0.2 to about $0.4\mu$.

The present invention is further understood and illustrated by reference to the following specific examples thereof in which all parts and percentages are on a by weight basis unless otherwise explicitly indicated.

Examples 1 and 2

In these examples, rubber modified ABS polymer blend compositions are prepared and tested having trimodal rubber particle size distribution and having two different levels of impact performance characteristics. In addition, two bimodal, solely emulsion-rubber-based compositions having similar levels of impact performance are prepared and tested for comparative purposes.

In preparing the compositions of Examples 1 and 2, a mass polymerized ABS composition ($ABS_{MP}$) is employed having a polybutadiene homopolymer rubber content of about 7.5 weight percent; a volume average rubber particle size of about 0.75 micron (and a number average particle size of about 0.3 micron); a graft copolymer to rubber weight ratio of about 0.6; and a matrix phase styrene/acrylonitrile (SAN) copolymer having a styrene content of about 72 weight percent and an acrylonitrile content of about 28 weight percent and having a weight averaged molecular weight of about 170,000; and wherein the matrix phase constitutes about 88 percent of the total weight of said mass ABS composition.

The emulsion polymerized ABS constituent ($ABS_{EP}$) employed in Examples 1 and 2 is a bimodal rubber particle size-containing composition wherein (1) the emulsion rubber particles are a 93:7 weight ratio butadiene/styrene copolymer rubber, (2) the small emulsion rubber particles have a volume average diameter of about 0.15 micron (number average diameter of about 0.09 micron) and the large emulsion particles have a volume average diameter of about 0.55 micron (number average diameter about 0.35 micron , (3) the total emulsion rubber content is about 47 weight percent, (4) the graft-to-rubber weight ration is about 0.55 and (4) the weight ratio of small to large emulsion rubber particles is about 75:25. The matrix phase of said bimodal emulsion ABS composition constitutes about 25 weight percent thereof and is composed of a SAN copolymer having a S:AN weight ratio of about 70:30 and a weight averaged molecular weight of about 125,000.

The remainder of the matrix phase of the Example 1 and 2 compositions is composed of styrene/acrylonitrile copolymer (SAN) having a S:AN weight ratio of about 69:31 and a weight averaged molecular weight of about 95,000.

The proportions of the foregoing ingredients employed in preparing the Example 1 and 2 compositions are summarized in Table 1 along with the physical properties of the resulting trimodal ABS compositions.

The comparative bimodal emulsion-rubber-based compositions are prepared using the same SAN and $ABS_{EP}$compositions which have been described above. The relative proportions employed and the physical properties of the resulting bimodal compositions are also summarized in Table 1. As can be seen from the results in Table 1, the trimodal compositions of Examples 1 and 2 give comparable gloss, gloss sensitivity (i.e., gloss gradient) and impact performance relative to those of Comparisons 1 and 2, respectively, while at the same time giving substantially higher melt flow rate (MFR) values. As can also be seen the comparable impact strength values are provided by the Example 1 and Example 2 compositions at substantially lower rubber contents than that which is required to achieve similar impact strength values within the corresponding all emulsion-based comparative compositions.

TABLE I

| Composition (Wt %) | Example 1 | Comparison 1 | Example 2 | Comparison 2 |
|---|---|---|---|---|
| $ABS_{MP}$ | 29 | | 39 | |
| $ABS_{EP}$ | 17 | 33 | 20 | 40 |
| SAN | 54 | 67 | 41 | 60 |
| % Rubber | | | | |
| Mass | 2.2 | 0 | 2.9 | 0 |
| Small and Large Emulsion | 8.0 | 15.5 | 9.4 | 18.8 |
| Total | 10.2 | 15.5 | 12.3 | 18.8 |
| % Mass/% Total | 22 | 0 | 24 | 0 |
| Properties | | | | |
| Gardner Gloss[1] | | | | |
| Full shot | 99 | 99 | 97 | 98 |
| Short Shot | 65 | 62 | 54 | 63 |
| Gradient, % | 34 | 37 | 44 | 36 |
| IZOD[2], 73° F. | 1.3 | 1.5 | 2.6 | 3.2 |

TABLE I-continued

| Composition (Wt %) | Example 1 | Comparison 1 | Example 2 | Comparison 2 |
|---|---|---|---|---|
| MFR "I"[3] | 6.7 | 5.0 | 5.1 | 3.5 |

[1] 60° gloss on a 2 inch disk injection molded at 425° F., 100° F. mold. Short shot is 90 percent by weight of a fully packed part. Gloss gradient is the difference between full shot and short shot gloss, expressed as a percentage of the full shot gloss.
[2] ASTM D-256, ⅛ inch notched specimen.
[3] ASTM D-1238 230° C./3.8 Kg.

In order to examine and illustrate the effect of mass rubber content on the properties of the trimodal ABS compositions, two trimodal comparative compositions are prepared which have impact and full shot gloss values similar to those of the Example 1 and 2 compositions but which utilize more than 30 weight percent of the mass rubber particles on a total rubber constituent weight basis. As can be seen from the results which are presented in Table 2, the comparative compositions exhibit greater gloss sensitivity to molding conditions (i.e., higher gloss gradient) than do the Example 1 and Example 2 compositions.

TABLE 2

| Composition (Wt %) | Comparison 3 | Example 1 | Comparison 4 | Example 2 |
|---|---|---|---|---|
| $ABS_{MP}$ | 44 | 29 | 52 | 39 |
| $ABS_{EP}$ | 14 | 17 | 16 | 20 |
| SAN | 42 | 54 | 32 | 41 |
| % Rubber | | | | |
| Mass | 3.3 | 2.2 | 3.9 | 2.9 |
| Small and Large Emulsion | 6.6 | 8.0 | 7.5 | 9.4 |
| Total | 9.9 | 10.2 | 11.4 | 12.3 |
| % Mass/% Total | 33 | 22 | 33 | 24 |
| Properties | | | | |
| Gardner Gloss[1] | | | | |
| Full shot | 98 | 99 | 95 | 97 |
| Short Shot | 55 | 65 | 42 | 54 |
| Gradient, % | 44 | 34 | 56 | 44 |
| IZOD[2], 73° F. | 1.6 | 1.3 | 2.7 | 2.6 |
| MFR "I"[3] | 6.9 | 6.7 | 5.0 | 5.1 |

Footnotes [1]-[3]: See Table 1

As a further comparison, two additional comparative compositions are prepared wherein the mass polymerized ABS constituent employed ($ABS_{MP-BCR}$) is based upon a 70:30 butadiene/styrene block copolymer rubber in place of the butadiene homopolymer rubber-based mass ABS constituent of Examples 1 and 2.

As can be seen from the results presented in Table 3, the block copolymer-based comparative Compositions 5 and 6, while having comparable impact performance and somewhat higher melt flow rate (MFR) values relative to Example 1 and 2, respectively, nonetheless have substantially lower full shot gloss and substantially greater molding condition gloss sensitivity (i.e., gloss gradient).

TABLE 3

| Composition (Wt %) | Comparison 5 | Example 1 | Comparison 6 | Example 2 |
|---|---|---|---|---|
| $ABS_{MP}$ | | 29 | | 39 |
| $ABS_{MP-BCR}$ | 18 | | 21 | |
| $ABS_{EP}$ | 20 | 17 | 23 | 20 |
| SAN | 62 | 54 | 56 | 41 |
| % Rubber | | | | |
| Mass | 2.9 | 2.2 | 3.4 | 2.9 |
| Small and Large Emulsion | 9.4 | 8.0 | 11.0 | 9.4 |
| Total | 12.3 | 10.2 | 14.4 | 12.3 |
| % Mass/% Total | 24 | 22 | 24 | 24 |
| Properties | | | | |
| Gardner Gloss[1] | | | | |
| Full shot | 86 | 99 | 84 | 97 |
| Short Shot | 35 | 65 | 29 | 54 |
| Gradient, % | 59 | 34 | 65 | 44 |
| IZOD[2], 73° F. | 1.6 | 1.3 | 2.4 | 2.6 |
| MFR "I"[3] | 7.6 | 6.7 | 6.5 | 5.1 |

Footnotes [1]-[3] are the same as in Table 1.

Examples 3 and 4

In these examples, the mass ABS, bimodal emulsion ABS and SAN matrix resin ingredients of Examples 1 and 2 are formulated to prepare a series of trimodal ABS compositions having a total rubber content of 7.5 weight percent and having varying levels of the mass rubber particle constituent. The compositions and property evaluation results for the resulting trimodal compositions are presented in Table 4 along with those of the mass ABS ingredient itself and a 7.5 weight percent rubber content bimodal emulsion rubber-based composition.

TABLE 4

| Composition (Wt %) | Comparison 7 | Example 3 | Example 4 | Comparison 8 | Comparison 9 | Comparison 10 |
|---|---|---|---|---|---|---|
| $ABS_{MP}$ |  | 15.1 | 25.1 | 35.1 | 45.1 | 100 |
| $ABS_{EP}$ | 16 | 13.6 | 12.0 | 10.4 | 8.8 |  |
| SAN | 84 | 71.3 | 62.9 | 54.5 | 46.1 |  |
| % Rubber |  |  |  |  |  |  |
| Mass |  | 1.13 | 1.88 | 2.63 | 3.38 | 7.50 |
| Small and Large Emulsion | 7.50 | 6.38 | 5.63 | 4.88 | 4.13 |  |
| Total | 7.5 | 7.5 | 7.5 | 7.5 | 7.5 | 7.5 |
| % Mass/% Total | 0 | 15 | 25 | 35 | 45 | 100 |
| Properties |  |  |  |  |  |  |
| Gardner Gloss[1] |  |  |  |  |  |  |
| Full shot | 99 | 98 | 97 | 97 | 95 | 86 |
| Short Shot | 74 | 69 | 66 | 57 | 49 | 29 |
| Gradient, % | 25 | 30 | 32 | 41 | 48 | 66 |
| IZOD[2], 73° F. | 0.4 | 0.7 | 0.9 | 1.0 | 1.3 | 1.2 |
| MFR "I"[3] | 14.2 | 11.2 | 11.8 | 9.1 | 8.0 | 3.0 |

Footnotes [1-3] are the same as in Table 1.

Examples 5-8

In these examples, a series of trimodal rubber particles size ABS compositions are prepared having a total rubber content of 12 weight percent and having mass rubber particle contents ranging from 5 to 20 weight percent on a total rubber content weight basis. The compositional details and the physical properties of the resulting compositions are summarized in Table 5.

TABLE 5

| Composition (Wt %) | Example 5 | Example 6 | Example 7 | Example 8 |
|---|---|---|---|---|
| $ABS_{MP}$ | 8 | 16 | 24 | 32 |
| $ABS_{EP}$ | 24.3 | 23.0 | 21.7 | 20.4 |
| SAN | 67.7 | 61.0 | 54.3 | 47.6 |
| % Rubber |  |  |  |  |
| Mass | 0.6 | 1.2 | 1.8 | 2.4 |
| Small and Large Emulsion | 11.4 | 10.8 | 10.2 | 9.6 |
| Total | 12 | 12 | 12 | 12 |
| % Mass/% Total | 5 | 10 | 15 | 20 |
| Properties |  |  |  |  |
| Gardner Gloss[1] |  |  |  |  |
| Full shot | 98 | 96 | 96 | 95 |
| Short Shot | 61 | 51 | 51 | 47 |
| Gradient, % | 38 | 47 | 47 | 51 |
| IZOD[2], 73° F. | 1.1 | 1.5 | 1.6 | 2.1 |
| MFR "I"[3] | 8.0 | 7.0 | 6.1 | 5.2 |

Footnotes [1-3] are the same as in Table 1.

While the subject matter hereof has been described and illustrated by reference to certain specific embodiments and examples thereof, such is not to be interpreted as in any way limiting the scope of the instantly claimed invention.

What is claimed is:

1. A rubber-modified, glossy impact-resistant polymeric composition comprising:
    (a) a continuous matrix phase comprising an interpolymer comprising monovinylidene aromatic monomer and ethylenically unsaturated nitrile monomer polymerized therein; and
    (b) dispersed in such matrix in the form of discrete particles, from about 5 to less than 14 weight percent, based on the total weight of said polymeric composition, of rubber material, wherein the dispersed rubber material comprises the following three rubber components;
    (1) a small particle emulsion rubber component which comprises one or more rubbery diene homopolymers or interpolymers and which is from about 10 to about 88 weight percent of the total rubber content, the particles of this component having a volume average diameter of from about 0.05 to about 0.25 microns;
    (2) a large emulsion particle rubber component which comprises one or more rubbery diene homopolymers or interpolymers and which is from about 7 to about 85 weight percent of the total rubber content, the particles of this component having a volume average diameter of from about 0.35 to about 0.95 micron; and
    (3) a mass rubber particle component which comprises a diene polymer material having a polymerized diene monomer content of at least about 80 weight percent and which constitutes from about 5 to about 30 weight percent of the total rubber content, the particles of this component having a volume average diameter of from about 0.15 to about 0.95 micron and a number average diameter of from about 0.1 to about 0.45 micron.

2. A polymeric composition according to claim 1 wherein rubber component (1) has a volume average diameter of from about .08 to about 0.2 micron and is from about 25 to about 65 weight percent of the rubber; rubber component (2) has a volume average diameter of from about 0.4 to about 0.9 micron and is from about 20 to about 40 weight percent of the rubber, and rubber component (3) has a volume average diameter of from about 0.4 to about 0.9 micron and a number average diameter of from 0.2 to 0.4 micron and is from about 10 to about 25 weight percent of the rubber.

3. The polymeric composition according to claim 1 wherein the matrix phase constitutes at least about 70 percent by weight of the total polymeric composition and comprises from about 15 to about 35 weight percent of the ethylenically unsaturated nitrile monomer polymerized therein based on the combined weight of the monovinylidene aromatic and ethylenically unsaturated nitrile monomers.

4. The polymeric composition according to claim 3 wherein the monovinylidene aromatic monomer is styrene and the ethylenically unsaturated nitrile monomer is acrylonitrile.

5. The polymeric composition according to claim 4 comprising from about 1 to about 40 weight percent methyl methacrylate polymerized therein based on weight styrene, acrylonitrile and methyl methacrylate monomers polymerized therein.

6. The composition according to claim 1 wherein rubber component (2) is an agglomerate of smaller, emulsion-produced particles.

7. The composition according to claim 1 wherein the dispersed rubber consists essentially of:
  (1) a small particle emulsion rubber component being from about 15 to about 75 weight percent of the rubber, the particles of this component having a volume average diameter of from about 0.08 to about 0.2 micron and consisting of emulsion produced rubber;
  (2) a large emulsion particle rubber component being from about 10 to about 50 weight percent of the rubber, the particles of this component having a volume average diameter of from about 0.5 to about 0.8 micron, such particles resulting from the agglomeration of smaller emulsion-produced rubber particles; and
  (3) a large mass particle rubber component being from about 10 to about 25 weight percent of the rubber, the particles of this component having a volume average diameter of from about 0.4 to about 0.9 micron and a number average diameter of from about 0.2 to about 0.4 micron.

8. The composition according to claim 1 wherein the total dispersed rubber particle content thereof is from about 7 to about 13.5 percent of the total weight of said composition.

9. The composition according to claim 1 wherein the total dispersed rubber particle content thereof is from about 8 to about 13 percent of the total weight of said composition.

10. The composition according to claim 1 wherein the rubber constituent of the mass rubber particle is a diene homopolymer and wherein such mass rubber component constitutes from 10 to about 30 weight percent of the total rubber content within said composition.

* * * * *